United States Patent Office 3,048,570
Patented Aug. 7, 1962

3,048,570
POLYMERIC SECONDARY ALCOHOLS HAVING RECURRING ALPHA-HYDROXY AMIDE GROUPS
Howard Ensign Simmons, Jr., Wilmington, Del., assignor to E. I. du Pont de Nemours and Company, Wilmington, Del., a corporation of Delaware
No Drawing. Filed Oct. 26, 1959, Ser. No. 848,541
14 Claims. (Cl. 260—87.3)

This invention relates to a new class of polymers. In particular, it relates to polymers containing lateral hydroxyl and amide groups attached directly to common carbon atoms of the polymer chain and to a process for their preparation.

Polymers containing amide groups laterally attached to backbone carbons, i.e., intralinear carbons, of the chain structure are known. Likewise known are polymers containing hydroxyl groups laterally attached to carbons of the polymer chain. Each of these classes of polymers has important properties specifically attributed to the substituent groups. Thus, amide substituents impart to polymers both wool-like properties and the capacity for chemical modification such as cross-linking with formaldehyde. The hydroxyl substituent imparts resistance to greases, oils and organic solvents as illustrated by polyvinyl alcohol. A combination of the above properites in one and the same polymer molecule would afford useful plastic products having properties not hereofore attained.

It has now been found that a new and useful class of polymers may be prepared readily by the reaction of polymeric secondary alcohols which are essentially free of primary alcohol groups with alkali metal cyanides and chlorine in an aqueous alkaline medium.

The amidation or partial amidation reaction by which the products of this invention are prepared is illustrated below for a linear polymer whose chain consists of carbon atoms at least some of which bear both a hydroxyl group and a hydrogen atom, using sodium cyanide, chlorine and sodium hydroxide as the other reactants:

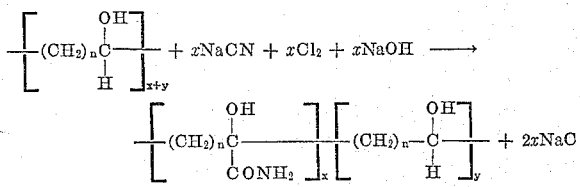

where $n$, $x$ and $y$ are integers and where $y$ may also be zero. When $y$ is zero, a completely amidated product is formed. When $y$ is an integer, the ratio of $y$ to $x$ may vary up to 100 or even higher.

All polymeric secondary alcohols are suitable for use in the process of the invention and produce useful products.

Polyvinyl alcohol can be used in the process as well as other secondary polymeric alcohols, such as hydrolyzed or partially hydrolyzed olefin-vinyl ester copolymers and reduced ethylene-carbon monoxide copolymers prepared as described in U.S. Patents 2,386,347 and 2,495,292, respectively. Examples of other polymers containing secondary hydroxyl groups are hydroxylated polyamides as described in U.S. Patent 2,176,074, e.g.,

[NH—CH$_2$CH(OH)CH$_2$NH—CO(CH$_2$)$_4$CO—]$_n$ obtained by reaction of 1,3-diaminopropanol-2 with adipic acid; alkyd resins containing secondary hydroxyl groups such as 1:1 glycerol-dibasic acid resins, e.g., glycerol-phthalic anhydride resin as described in British Patent 305,965

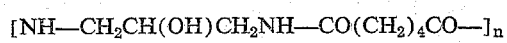

and glycerol-malic acid resin as described in U.S. Patent 1,091,627

[—OOCCH(OH)CH$_2$COOCH$_2$CH(OH)CH$_2$—]$_n$ epoxy resins containing secondary hydroxy groups, e.g., bis-phenol [bis-(4-hydroxylphenyl)-2,2-propane]-epichlorohydrin resin,

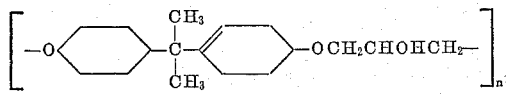

as described in U.S. Patent 2,500,449, and bis-phenol-bis-(2,3-epoxypropyl)ether resin,

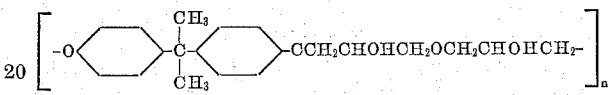

as described in U.S. Patent 2,503,726 (see also I Skeist, "Epoxy Resins," Reinhold Publishing Corp., New York (1958)). Preferred polymers for use in the novel process are linear, essentially carbon chain polymers having a plurality of hydroxyl groups attached directly to hydrogen-bearing carbon atoms of the polymer chain because of the greatly enhanced utility of the resulting polymers. The molecular weight of the polymeric reactant is not critical. Preferably high molecular weight polymers are used, i.e., those having a molecular weight of about 20,000 or greater. The presence of substituents other than hydroxyl groups e.g., ester groups as in a partially hydrolyzed ethylene/vinyl ester polymer, on other carbons in the polymer is not objectionable, but this may require the use of additional reactant materials.

Any alkali metal cyanide may be used in the process of the invention. Sodium or potassium cyanides are preferred.

Alkaline reaction conditions wherein the pH is above 7 are required. The alkaline reaction medium is preferably an aqueous solution of an alkali metal hydroxide such as sodium or potassium hydroxide. However, mixed aqueous-nonaqueous solutions of alkali metal hydroxides may be used and are intended to be encompassed by the term "aqueous."

Chlorine is the most economical and the preferred halogen for use in this invention, but bromine may be used.

The molal ratio in which the reactants are brought together is not critical and depends on the ratio of

groups to polymer chain carbons and the degree of amidation desired. For complete amidation, theoretically a mol each of alkali metal cyanide, halogen and alkali hydroxide is required for each mol unit of

groups present in the polymer chain. In practice an excess of 200–500% of the reagents is used, if a high degree of amidation is desired. An excess of alkali metal hydroxide over that required by the amide-forming reaction is also usually used in order to maintain an alkaline pH in the reaction medium. The quantity of halogen used is generally the amount necessary to neutralize the reaction mixture but greater or smaller proportions may be used if desired. As a general rule less than complete amidation will be desired. Advantages of amidation may be obtained when as little as 5% or even less of the

groups in the polymer chain are amidated. Under such circumstances a limited amount of a mixture of alkali metal cyanide, halogen and alkali metal hydroxide will ordinarily be used.

The reaction of the present invention is carried out preferably at −10° to +5° C., but other temperatures varying between about −25° C. and 50° C. may be used. The time of the reaction is determined in large part by the reaction conditions (i.e., efficiency of cooling, rate and efficiency of agitation and rate of introducing halogen) and the size of the charge. The reaction is usually terminated when the reaction mixture becomes neutral, i.e., pH 7.

In the illustrative examples which follow, parts are by weight unless otherwise specified.

*Example I*

A solution consisting of polyvinyl alcohol (44 parts) of molecular weight about 20,000, potassium cyanide (65 parts), sodium hydroxide (60 parts) and water (600 parts) was prepared. The temperature of the solution was lowered to −5° C. by external cooling, and chlorine gas was passed into the stirred solution. The temperature was maintained at 0–5° C., and chlorination was continued until the solution became neutral. At the end of the reaction, a water-insoluble polymer had precipitated (the polyvinyl alcohol employed in the reaction was water soluble). The precipitated polymer was collected by suction filtration and was washed with hot water until the washings were colorless. A final washing with ethanol left a light tan, fine powder which was dried at 60° C. (0.5 mm.). The product weighed 46 parts and was shown by analysis to contain less than 0.07% total halogen. Nitrogen analysis indicates that 33% of the secondary alcohol groups in the chain were converted to α-hydroxyamide units.

*Analysis.*—Calc'd for $C_7H_{13}NO_4$: N, 8.0. Found: N, 7.61.

The infrared spectrum shows typical α-hydroxyamide absorption with bands at 2.9μ (OH), 3.1μ (NH$_2$), 5.85μ (C=O) and 6.25μ (NH$_2$) and is very similar to the spectrum of α-hydroxyisobutyramide.

The new polymer is a pale tan powder, which mats to a hard, leathery cake when washed with water and dried. When washed with ethanol and dried, it is obtained as a fine powder, which does not melt on heating to 200° C. The polymer is very hydrophilic and absorbs water readily to form a spongelike paste when wet. Unlike polyvinyl alcohol, it can be collected from aqueous mixtures on filter paper by suction filtration.

A sample of the above polymer in powder form (0.5 part) was wetted with enough water to make a thick nonflowing paste. A thin layer of the paste was spread over the larger end of two No. 10 corks, which were clamped together under a pressure of five pounds overnight to test adhesive properties of the polymer. The corks were bound sufficiently strongly after drying so that it was impossible to separate them manually by applying longitudinal tension. Under severe bending stress, the corks ruptured; however, the break occurred in the cork itself and not along the adhesive line. The above test was repeated using the parent polyvinyl alcohol as the adhesive agent. In this case manual longitudinal tension pulled the corks apart rather easily. The break occurred along the glue line and the body of neither cork was ruptured. This test demonstrated the good adhesive-binding properties of the amidated polymer. When the polymer has "set" from water, rewetting occurs only slowly and with difficulty.

*Example II*

A solution consisting of polyhydroxyalkane (hydrolyzed vinyl acetate/ethylene copolymer, 95:5 weight ratio) (19.2 parts), potassium cyanide (28.1 parts), sodium hydroxide (25.9 parts) and water (500 parts) was prepared. The temperature of the solution was lowered to −5° C. by external cooling and chlorine gas was passed into the stirred solution. The temperature was maintained at 0–5° C. and chlorination was continued until the solution became neutral. At the end of the reaction, a water-insoluble polymer had precipitated (the polyhydroxyalkane employed in the reaction was water soluble). The precipitated polymer was collected by suction filtration and washed with hot water. The product was suspended in a large volume of water and stirred at 50° C. for 12 hours. The polymer was then filtered hot by suction and washed with ethanol. The polymer weighed 21 parts after drying at 60° C. (0.5 mm.), and was a snow-white, hydrophilic powder, which did not melt at 200° C. The analysis is calculated on the basis that 25% of the secondary alcohol units have been converted to α-hydroxyamide units.

*Analysis.*—Calc'd for $C_{31}H_{59}N_3O_{15}$: N, 5.9. Found: N, 5.7.

The infrared spectrum shows typical α-hydroxyamide absorption and is very similar to the spectrum of the product obtained in Example I. The product is very hydrophilic and absorbs water readily. It has adhesive properties similar to those of the product of Example I.

The products of the invention are generically polymeric secondary alcohols essentially free of primary alcohol groups and have amide

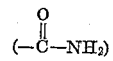

groups attached to at least 5% of the hydroxyl-bearing carbon atoms. The preferred products are linear essentially carbon-chain polymers, having a plurality of hydroxyl groups attached directly to carbons of the polymer chain, with amide

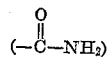

groups attached to at least 5% of the hydroxyl-bearing carbon atoms.

The amidated polyvinyl alcohol-type polymers are very different from the parent polymers. They are higher melting and much less soluble in water than the original polymers, yet remain highly hydrophilic in nature. The properties of the new polymers of this invention also vary, depending on the properties of the starting polymers. The properties of the starting polymers are to some extent dependent upon the degree of hydroxyl substitution, molecular weight, linearity, etc. Products of varying properties may be prepared from any one starting material, depending upon the extent of amidation of the starting polymer.

Polymer products produced from polyvinyl alcohol by converting a minority of the secondary alcohol groups to α-hydroxyamide groups, as in Example I, are useful as adhesives, as components of light-sensitive photographic emulsions, as binders for nonwoven fabrics and as sizes for paper and natural and synthetic fibers, as well as components of water-dispersed protective coatings. Amidated polymers produced from polyvinyl alcohol, or similar polyhydroxylated polymers, wherein a plurality of the secondary alcohol groups have been converted to α-hydroxyamide groups according to this invention, though highly hydrophilic are swollen but little by water and can be used in shaped articles such as support films for photographic emulsions, wrapping films, filaments, fibers, tubing and molded articles such as dinnerware, gears, decorative articles, etc. The usefulness of the α-hydroxyamide polymers of this invention is further extended, because they can be rendered thermohardening by treatment with aldehydes, such as formaldehyde. Thus, thermoset articles can be prepared by heating formaldehyde-treated amidated polymers of this invention.

The polymers of this invention have good receptivity to dyes, especially acidic and direct-type dyes, which make them useful for the preparation of decorative articles The amide polymers of this invention can be hydrolyzed to the corresponding polymeric acids of the structural unit

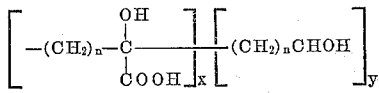

where $n$, $x$ and $y$ are integers as designated hereinbefore. These polymeric α-hydroxyacids can be used as coatings or for the manufacture of films or other shaped articles wherein the polyacid can also be cured by inter-chain esterification or by reaction with other polyfunctional compounds such as glycerol or toluenediisocyanate to insoluble or infusible durable articles. The polymeric acids can be converted to water-soluble ammonium or alkali metal salts useful as thickeners, sizes and the like.

What is claimed is:

1. A process for converting intralinear secondary alcohol groups,

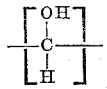

of a polymer which is essentially free of primary alcohol groups to intralinear

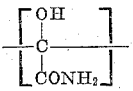

groups, comprising admixing said polymer, in an aqueous alkaline medium, with an alkali metal cyanide and a halogen selected from the class consisting of chlorine and bromine while maintaining a temperature of from −25° C. to 50° C.

2. The process of claim 1 wherein the halogen is chlorine.

3. The process of claim 1 wherein the alkali metal cyanide is selected from the class consisting of sodium cyanide and potassium cyanide.

4. The process of claim 1 wherein the aqueous medium is an aqueous solution of an alkali metal hydroxide.

5. The process of claim 1 wherein said polymer has a molecular weight of at least 20,000.

6. The process of claim 1 wherein said polymer is a reduced ethylene-carbon monoxide copolymer.

7. The process of amidating polyvinyl alcohol having a molecular weight of about 20,000 comprising admixing said alcohol with potassium cyanide and chlorine in aqueous sodium hydroxide while maintaining a temperature of from −10° C. to 5° C.

8. The process of amidating a hydrolyzed vinyl acetate/ethylene copolymer comprising admixing said copolymer with potassium cyanide and chlorine in aqueous sodium hydroxide while maintaining a temperature of −10° C. to 5° C.

9. A polymeric secondary alcohol essentially free of primary alcohol groups and having recurring intralinear

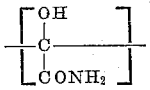

groups.

10. A polymeric secondary alcohol essentially free of primary alcohol groups and having an amide group (—$CONH_2$) bonded directly to each of at least 5% of the intralinear, hydroxyl-bearing secondary carbons.

11. A polymer of claim 10 having a molecular weight of at least 20,000.

12. Polyvinyl alcohol having a molecular weight of about 20,000 and having an amide group (—$CONH_2$) bonded directly to each of at least 5% of the intralinear hydroxyl-bearing secondary carbons.

13. Hydrolyzed vinyl acetate/ethylene copolymer having an amide group (—$CONH_2$) bonded directly to each of at least 5% of the intralinear, hydroxyl-bearing secondary carbons.

14. An adhesive consisting essentially of water and a polymer of claim 11.

References Cited in the file of this patent

FOREIGN PATENTS 461,635   Great Britain _____ Feb. 22, 1937